United States Patent
Mussari

(10) Patent No.: US 9,492,804 B2
(45) Date of Patent: Nov. 15, 2016

(54) SYSTEM AND METHODS FOR GENERATING CHLORINE DIOXIDE

(75) Inventor: Frederick P. Mussari, Melbourne, FL (US)

(73) Assignee: BCR ENVIRONMENTAL CORPORATION, Jacksonville, FL (US)

( * ) Notice: Subject to any disclaimer, the term of this patent is extended or adjusted under 35 U.S.C. 154(b) by 290 days.

(21) Appl. No.: 13/514,545

(22) PCT Filed: Dec. 7, 2010

(86) PCT No.: PCT/US2010/059208
§ 371 (c)(1),
(2), (4) Date: Sep. 26, 2012

(87) PCT Pub. No.: WO2011/071862
PCT Pub. Date: Jun. 16, 2011

(65) Prior Publication Data
US 2013/0015113 A1    Jan. 17, 2013

Related U.S. Application Data

(60) Provisional application No. 61/267,142, filed on Dec. 7, 2009.

(51) Int. Cl.
*C01B 11/02* (2006.01)
*C02F 1/68* (2006.01)
(Continued)

(52) U.S. Cl.
CPC ............ *B01J 10/002* (2013.01); *B01J 4/002* (2013.01); *C01B 11/024* (2013.01); *C02F 1/685* (2013.01);
(Continued)

(58) Field of Classification Search
CPC ........ C02F 1/008; C02F 1/685; C02F 1/686; C02F 1/72; C02F 1/76; C02F 1/763; C01B 11/022; C01B 11/023; C01B 11/024; C01B 11/025; B01J 4/002; B01J 10/002; B01J 2204/005; B01J 2219/00033; B01J 2219/00166
See application file for complete search history.

(56) References Cited

U.S. PATENT DOCUMENTS 4,534,952 A * 8/1985 Rapson et al. ................ 423/478
5,407,656 A   4/1995 Roozdar
(Continued)

FOREIGN PATENT DOCUMENTS

EP    0119686 A1    9/1984
JP    2009-136723 A    6/2009
(Continued)

OTHER PUBLICATIONS

Mexican Office Action issued Oct. 30, 2013 for Application No. MX/A/2012/006529.
(Continued)

*Primary Examiner* — Lucas Stelling
(74) *Attorney, Agent, or Firm* — Lando & Anastasi, LLP

(57) ABSTRACT

Disclosed herein are embodiments of a chlorine dioxide generating system. The system typically includes a reactor having a reactor volume into which sulfuric acid and sodium chlorite are delivered according to Formula 1: $(C_1)(F_1)=C_2$, wherein $F_1$=flow rate of delivery of sodium chlorite to the at least one reactor, volume/time, $C_1$=amount of $ClO_2$ produced per amount of sodium chlorite delivered to reactor; and $C_2$=$ClO_2$ output amount/time; and wherein said reactor volume and $F_1$ are such so as to provide a contact time between acidifying agent and sodium chlorite in the range of about 0.5 to about 30 minutes.

24 Claims, 2 Drawing Sheets

(51) Int. Cl.
*C02F 1/76* (2006.01)
*B01J 10/00* (2006.01)
*B01J 4/00* (2006.01)
*C02F 1/00* (2006.01)

(52) U.S. Cl.
CPC ............ *C02F 1/76* (2013.01); *B01J 2204/005* (2013.01); *B01J 2219/00033* (2013.01); *B01J 2219/00166* (2013.01); *C02F 1/008* (2013.01)

(56) References Cited

U.S. PATENT DOCUMENTS

| | | |
|---|---|---|
| 5,770,033 A | 6/1998 | Murphy et al. |
| 6,051,135 A | 4/2000 | Lee et al. |
| 6,468,479 B1 | 10/2002 | Mason et al. |
| 6,645,457 B2 | 11/2003 | Mason et al. |
| 7,186,376 B2 | 3/2007 | Iverson et al. |
| 2002/0136684 A1 | 9/2002 | Iverson et al. |
| 2003/0138371 A1 | 7/2003 | McWhorter et al. |
| 2005/0023224 A1* | 2/2005 | Schmitz ............ C02F 1/763 210/739 |
| 2005/0244328 A1 | 11/2005 | Schmitz et al. |
| 2007/0178021 A1 | 8/2007 | McWhorter et al. |
| 2007/0183961 A1 | 8/2007 | McWhorter et al. |
| 2007/0212292 A1 | 9/2007 | Mussari et al. |
| 2009/0159538 A1 | 6/2009 | Duve |

FOREIGN PATENT DOCUMENTS

| | | |
|---|---|---|
| WO | 0212130 A1 | 2/2002 |
| WO | 2003024582 A1 | 3/2003 |
| WO | 2003062144 A1 | 7/2003 |
| WO | 2009077309 A1 | 6/2009 |
| WO | 2011071862 A2 | 6/2011 |

OTHER PUBLICATIONS

Mexican Office Action dated May 6, 2014 for Application No. MX/A/2012/006529.
Japanese Office Action dated Sep. 16, 2014 for Application No. 2012-543193.
Mexican Office Action dated Dec. 3, 2014 for Application No. MX/A/2012/006529.

* cited by examiner

SYSTEM AND METHODS FOR GENERATING CHLORINE DIOXIDE

RELATED APPLICATIONS

This application is a U.S. national stage application and claims the benefit under 35 U.S.C. §371 of PCT/US2010/059208, titled SYSTEM AND METHODS FOR GENERATING CHLORINE DIOXIDE, filed Dec. 7, 2010, which claims priority to U.S. Provisional Application Ser. No. 61/267,142, titled, SYSTEM AND METHODS FOR GENERATING CHLORINE DIOXIDE, filed Dec. 7, 2009, which patent applications are hereby incorporated herein by reference in their entireties for all purposes.

FIELD OF THE INVENTION

The present invention relates to a novel chlorine dioxide production apparatus, or reactor, to a novel system for production of quantities of chlorine dioxide from commercial and other grades of starting materials, and to methods of using the reactor in situ.

BACKGROUND OF THE INVENTION

Various species of chlorine are used in small- and large-scale bleaching, oxidation, and disinfection, operations. These operations range from providing a weak sodium hypochlorite solution in a bottle for household whitening and disinfection (liquid bleach solutions, about 5% sodium hypochlorite), to delivering pure chlorine gas to a wastewater treatment plant waste stream. One problem with the use of pure chlorine gas, however, is its high toxicity and risk to workers case of leaks and accidents.

A common approach for large-scale water purification that can be safer than the transportation and subsequent on-site use of chlorine gas is the on-site production of chlorine dioxide. This strong oxidant is used for oxidation to disinfect water flows in drinking water treatment plants and in wastewater treatment plants. As a strong oxidant, chlorine dioxide destroys viruses, bacteria, and other microscopic organisms as it oxidizes compounds having a lower oxidation potential than itself. To maximize its oxidation and disinfection effects, in a water treatment system chlorine dioxide is preferably added after the sedimentation tank or basin.

Chlorine dioxide ($ClO_2$; CASR n 10049-04-4) is a greenish-yellow gas at room temperature that is stable in the dark but unstable in the light. As noted, it is recognized as an extremely powerful biocide, disinfectant agent and oxidizer. As to regulatory allowance of chlorine dioxide in commercial and wastewater and water purification applications, in 1967, the United States Environmental Protection Agency ("EPA") first registered the liquid form of chlorine dioxide for use as a disinfectant and sanitizer. In 1988, EPA registered chlorine dioxide gas as a sterilant.

Chlorine dioxide kills microorganisms by disrupting transport of nutrients across the cell wall. Chlorine dioxide is a gas, is highly soluble in water and smells like chlorine bleach. However, chlorine dioxide is not to be confused with chlorine gas. They are two distinct chemicals that react differently and produce by-products that also have little in common.

Chlorine dioxide, $ClO_2$, offers the following benefits. First, $ClO_2$ functions via an oxidative rather than chlorinating reaction, the mode of action of chlorine gas. This virtually eliminates the formation of chlorinated organic compounds that are suspected to increase certain cancer risks. Second, $ClO_2$ when generated on site, eliminates the need for site storage of chlorine and/or transportation thereof.

Several types of chlorine dioxide generators are commercially available. Many still utilize gaseous chlorine in their generation process, and while effective, the risk management issues associated with chlorine still remain.

SUMMARY

Many references disclose methods of production of chlorine dioxide. However, these references have not achieved the reliable results and consistent operation of the present invention, using the reactants and conditions of the present invention. Given the toxicity and risk inherent in the use of chlorine gas, there is a need to develop a safer and reliable alternative to its use in oxidation and disinfection applications. Given the overestimates of yields and understatement of by-products by known methods of chlorine dioxide production when technical or commercial grades of starting materials are used, there is a need to develop a method that reliably and consistently can utilize technical and commercial grade of reactants to produce chlorine dioxide at sufficiently high, economical yields with a minimum of undesirable by-products.

US Patent Publication 20050244328 discloses a generator and method of producing chlorine dioxide. The inventor of embodiments of the present invention represents further improvements and developments of chlorine dioxide generation.

The present invention, described and claimed below, advances the art by providing a reaction chamber, a system, and methods for the production of chlorine dioxide gas for oxidation and disinfection purposes. As described below, it advances the art by meeting the needs stated immediately above.

The present invention relates to a novel reaction chamber useful in the high-yield production of chlorine dioxide gas from commercial and technical grade reactants. The invention also includes systems useful for the addition of chlorine dioxide to flows in need of such compound in which more than one point of addition is provided, and monitoring of more than one point along the flow provides for replenishment of chlorine dioxide at points after the initial point of addition.

Thus, one object of the present invention is to advance the art of chlorine dioxide generation with a new design of a reaction chamber in which commercial and technical grades of common reactants are driven to safely react to completion or near completion to generate high yields of chlorine dioxide gas. A related aspect is to have the ability to generate a large or small quantity of chlorine dioxide using a single reaction chamber without the need to change anything other than the reactor volume or quantity (flow rate) of the precursor chemicals.

Another aspect of the present invention is to practice a method of chlorine dioxide production to generate high yields of chlorine dioxide gas. Another aspect of the present invention is to provide a means to produce chlorine dioxide in a place close to its use for disinfection of a stream of water or other liquid, to reduce the risks of toxics release and harm to workers, the environment, and nearby persons.

The foregoing has outlined some of the more pertinent aspects of the present invention. These aspects should be construed to be merely illustrative of some of the more prominent features and applications of the invention. The following detailed description and embodiments are exemplary and explanatory only and are not to be viewed as being restrictive of the present, as claimed. These and other objects, features and advantages of the present invention will become apparent after a review of the entire detailed description, the disclosed embodiments, and the appended claims. As will be appreciated by one of ordinary skill in the art, many other beneficial results and applications can be attained by applying modifications to the invention as disclosed. Such modifications are within the scope of the claims appended hereto.

DESCRIPTION OF THE PREFERRED EMBODIMENTS

Figure 1:
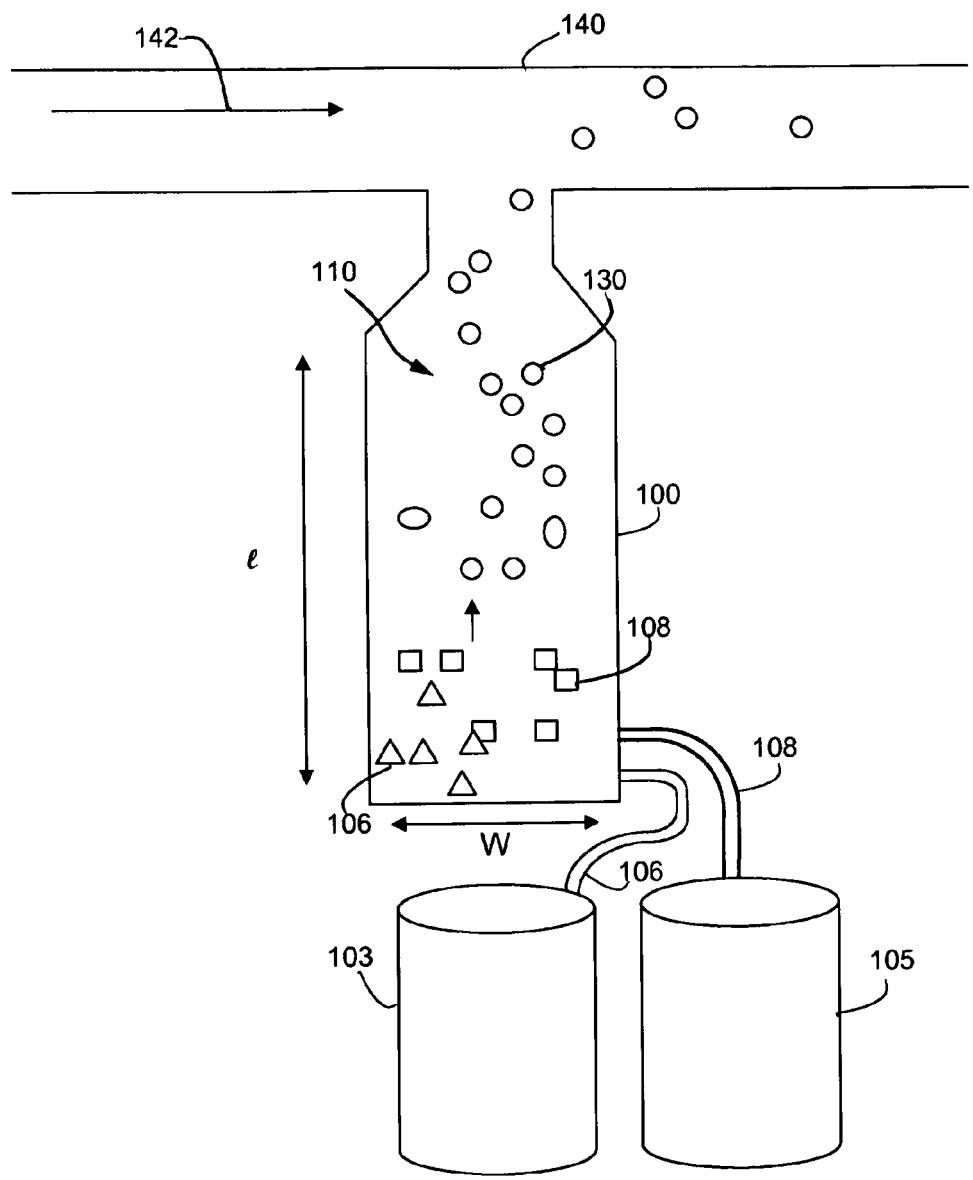
FIG. 1 presents a generalized depiction (not to scale) of an embodiment of the chlorine dioxide system of the present invention.

One embodiment of the present invention relates to a chlorine dioxide generating system, having as a key component a reaction chamber, wherein the system is engineered to optimize the production of chlorine dioxide gas from reactions among various combinations of reactants. As used throughout this disclosure, the terms reactants, pre-cursor chemicals, pre-cursor materials, and starting materials are defined to mean the same thing, namely, the chemicals that are passed into the reaction chamber for reaction to form the one or more products, or end-products, of the reaction. Also as used throughout this invention, pipe has its normal meaning, and "flow channel" is taken to mean a pipe as well as any open channel through which a fluid passes.

Typical embodiments of the chlorine dioxide system of the present invention utilize an acid solution and chlorite solution to produce chlorine dioxide. When implemented, for example, to treat a stream of municipal residential or mixed wastewater, this system utilizes a raw water pump to supply the water (carrier media) to an in-situ chemical reactor (also referred to as a reaction chamber or generator). The carrier water pump runs once the system is powered up and wastewater is flowing through the main wastewater conduit (pipe, channel, etc) of the waste stream that is being treated. In specific embodiments, input data may be obtained from a $ClO_2$ monitor and the flow switch signal a system controller to drive the chemical feed pumps. The chemical feed pumps draw their individual chemical solutions up from their storage tanks and deliver them to the chemical reactor. In more specific embodiments, this reactor is located so as to be effected by the flow of the water supplied by the raw water pump. This is done as a safety feature to assure that the chlorine dioxide goes into immediate solution preventing any potentially explosive conditions from occurring. A flow switch may optionally be provided in the raw carrier water line for halting the chemical feed, hence stopping $ClO_2$ generation, should a loss of carrier water occur. In more specific embodiments, each of the chemical feed lines is equipped with a flow switch connected in series with the other flows' flow switches, so that if one flow is interrupted, all flows cease.

In a specific embodiment, the system includes a reactor that delivers (doses) $ClO_2$ to a target water-containing source so as to achieve a target $ClO_2$ concentration to the target source. Examples of a target water-containing source include, but are not limited to, potable and non-potable water sources, sewer sludge, swimming pools, fountains, or other reservoirs containing a water component. Typically, the system will dose target sources via a conduit carrying a running stream. In an even more specific embodiment, the delivery of $ClO_2$ to the target source is adjusted based on the known flow rate of the flow stream, the known volume of the reactor and the flow rates of delivery of reactants to the reactors so as to allow a contact time among the reactants of 0.5-30 minutes in the reactor.

According to one example, a target concentration is achieved based on the following:

$$(C_1)(F_1) = C_2 \qquad \text{Formula I}$$

wherein
$F_1$ = flow rate of delivery of sodium chlorite to the at least one reactor (volume/time),
$C_1$ = amount of $ClO_2$ produced per amount of sodium chlorite delivered to reactor; and
$C_2$ = $ClO_2$ output (amount/time).

Based on the foregoing formula, output is adjusted by varying $F_1$ so long as the reactor volume and flow rate are such to enable contact time of the reactants of between 0.5-30 minutes. Typically, the target contact time is between about 1 minute and about 20 minutes. In a more specific embodiment, the target contact time is 1.5 minutes to 20 minutes. The reactor volume also affects the maximum output of the chlorine dioxide generating system. That is, once the flow rate is such as to meet the lowest desired contact time (or "reaction time"), the reactor volume must be increased to increase output. Accordingly, those skilled in the art will be able to modify the reactor volumes so as to meet the needed contact times and target output in order to meet target water-containing source chlorine dioxide concentrations (see e.g., Example 1, infra).

The above describes operation of typical embodiments of the chlorine dioxide system of the present invention. Additional safeguards that may be incorporated into these or other embodiments include, but are not limited to: (1) high, low, and critically low level indicators on the chemical storage tanks, (2) check and foot valves on either side of the chemical feed pumps as well as chemical flow switches to assure that all reactants are supplied to the reactor equally, (3) calibration columns on the discharge side of the chemical feed pumps, (4) check valves and a bypass arrangement around the reactor/injector to allow for service and inspection and (5) bi-directional telemetry to relay signals of the above and/or other parameters to a remote location, and to send back commands to pumps, etc. (such as for control, decision-making), and numerous other features that add to the performance of the system. Such additional features add to system reliability and safety in typical industrial workplace environments.

FIG. 1 provides a general operational diagram of a portion of a treatment (not to scale) system that shows the reactor of the present invention configured to dose a flow stream of a water-containing target source. FIG. 1 provides a general operational diagram of a portion of a treatment (not to scale) system 90 that shows a reactor embodiment 100 configured to dose a flowstream 142 of a water-containing target source. The reactor 100 has a volume 110 into which an acidifying agent source 103 delivers via a first conduit 106 an acidifying agent 106'. A chlorite source 105 also delivers a chlorite agent 108' to the volume 110 via conduit 108. Acidifying agent 106' and chlorite agent 108' react with each other in the volume 110 to produce $ClO_2$ 130. The reactor 100 is fluidly connected to a flow conduit 140. When $ClO_2$ is produced, it delivers the $ClO_2$ to the flowstream 142 in the flow conduit 140.

Further, while not being bound to using particular reactants, one exemplary reaction involves using sodium chlorite and sulfuric acid as the proton donor as shown below:

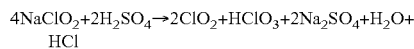
$$4NaClO_2+2H_2SO_4 \rightarrow 2ClO_2+HClO_3+2Na_2SO_4+H_2O+HCl$$

According to this equation, the concentration of chlorine dioxide inside the reactor is determined by the concentration of the precursor chemicals. Utilizing a 15% (pph) concentration of sodium chlorite for example, the maximum yield of chlorine dioxide is around 13% (pph). Under normal conditions, sodium chlorite is able to convert at a 85 percent (85%) conversion rate. Chlorine dioxide is highly soluble in water (up to 8%), and any $ClO_2$ gas coming out of solution rapidly dissolves in the treatment stream upon leaving the chamber. Since chlorine dioxide gas is explosive in concentrations exceeding 10% in air, this feature provides a level of safety unique to this invention.

By the term "effective amount" is meant a quantity in relation to other additions that has been found, or is determinable without undue experimentation, to be a sufficient amount to achieve a stated purpose, reaction, or goal.

In typical operations of the reactors of the present invention, the following chemical reactant solutions are used. In particular, the inventors have determined that concentrations of sulfuric acid of between 30-60 percent (pph) can be reacted with Sodium chlorite solutions of between 7.5 to 25 percent (pph). In one embodiment, a volume of sulfuric acid at 40-60 percent (pph) is combined in a reaction chamber with a volume of aqueous sodium chlorite at 7.5-25 percent (pph) and allowed to react for a predetermined period of time. In a more specific embodiment, a volume of 45-55 percent (pph) sulfuric acid is reacted with a volume of 12-17 percent (pph) sodium chlorite. In an even more specific embodiment, the 50 percent (pph) sulfuric acid solution and a 15 percent (pph) sodium chlorite solution is provided to the reaction chamber. The volumes may be in ratios from 0.1-10.0:10-0.1. In more specific embodiments, the ratio of volumes is 1-10:10-1, 1-5:5-1, 1-2:2-1, 1-1.5:1.5-1 or 1:1.

In an illustrative embodiment, the present invention relates to the use of 'dilute sulfuric acid' in the generation of chlorine dioxide, resulting in higher conversion rates than would be expected for this chemistry when used with prior-art methods. Further, generation according to the present invention produces $ClO_2$ with little or no conversion of generated chlorine dioxide to chlorate even with prolonged residence time in the reactor as occurs when hydrochloric acid two chemical generation methods are employed.

The general operating parameters of a typical reaction and reactor are as follows. As to pressure, when the reactor is "in situ" (within a pipe that is carrying water into which the reactor releases the reaction products), the input flow rate of the reactants, the reaction chamber volume, and the outflow from the reactor (typically a nozzle that prevents dilution of the reactants while not allowing excessive pressure to build up inside the reaction vessel) are configured so that the delivered reactants and reaction product flows toward the target water-containing source. In this way the reaction products (i.e., chlorine dioxide gas, minerals in solution or expelled as a diluted slurry, chlorine dioxide dissolved within the aqueous phase that largely is comprised of the combined water component of the chemical reactant solutions) are readily released into that target water-containing source on a desired continuous, semi-continuous, or pulsed basis.

In general, there are several operational alternatives in the use and admixing of the aqueous chemical solutions that contain the reactants of the present invention's method for the production of chlorine dioxide. At a very general level, with regard to pumping simplicity and maintaining a desired ratio of reactants to one another, one alternative is to produce aqueous chemical solutions at concentrations such that pumping these at a 1:1 ratio. These solutions are then added at this simple ratio to generate chlorine dioxide.

It is recognized that some users may not have an appropriate level of knowledge and/or skill, and/or may not devote the needed time to make adjustments to obtain consistently an output of chlorine dioxide within a desired range. Accordingly, in such situations, as another example of the above alternative, the ratio of the final reactant solutions are maintained at 1:1, but the concentration of the chlorite source is lowered. By so diluting the chlorite source, the output of chlorine dioxide is limited, even when the operator raises the pumping rate of the common chemical feed pump to its maximum capacity.

In some alternatives, an option is to monitor flow rate cessation by each chemical reactant solution pump, and shut down the entire system shut down if one fails. Another control mechanism is to have a control feedback loop that adjusts the pumping rate of one or more pumps based on a parameter of the system being out of a desired range.

It is noted that the reactants may at times yield a build-up of calcium or other metals within the reactor. This may be caused where the water to be treated contains high levels of calcium and/or other metals, such as iron. These metals may precipitate out and build up as scale within the reactor. Thus, as may be utilized in any of the embodiments of the reactor of the present invention, an additional input/output port, or feed line is introduced into the reactor. This allows for a water and/or chemical flushing of the reactor. Such flushing may be done with an acid such as that used in the reaction process. The frequency of the flushing is dependent upon the levels of precipitants in solution.

Also, although the present invention is described in certain examples below as being used to disinfect the effluent in wastewater treatment plants, it is recognized that the present invention has numerous other applications and is quite versatile. For instance, without being limiting, the reactions, apparatuses, methods and systems of the present invention may be used to disinfect or otherwise treat not only the effluent of wastewater treatment plants, but also the following:

1. the ballast water of ocean-going ships, to kill the larval and adult stages of exotic species that may have been pumped into the bilge at a foreign port, prior to discharging such ballast water at another port (to prevent environmental problems such as the zebra mussel in the United States);

2. disinfecting and/or sterilizing municipal waste, agricultural or other treatment plant process sludges/biosolids;

3. disinfecting sources of water to be used for potable (drinking) water, water used for animal husbandry, or other process waters;

4. washing and disinfecting applications for fruits and vegetables. It is recognized that chlorine dioxide oxidizes certain pesticide residues, making them less harmful to consumers.

5. As a method to provide additional treatment to wastewater in areas of outbreaks of severe acute respiratory syndrome ("SARS"), such as by applying chlorine dioxide so generated to incoming wastestreams to a WWTP, and/or at sites where victims of such syndrome are known to be living.

6. Odor control, to oxidize sulfur compounds, such as hydrogen sulfide, without forming colloidal sulfurs.

7. Generating stocks solutions of chlorine dioxide to treat pulp and paper, to disinfect surfaces, and for other EPA-approved purposes.

The following non-limiting examples are presented to better illustrate the invention.

Example 1

Figure 2:
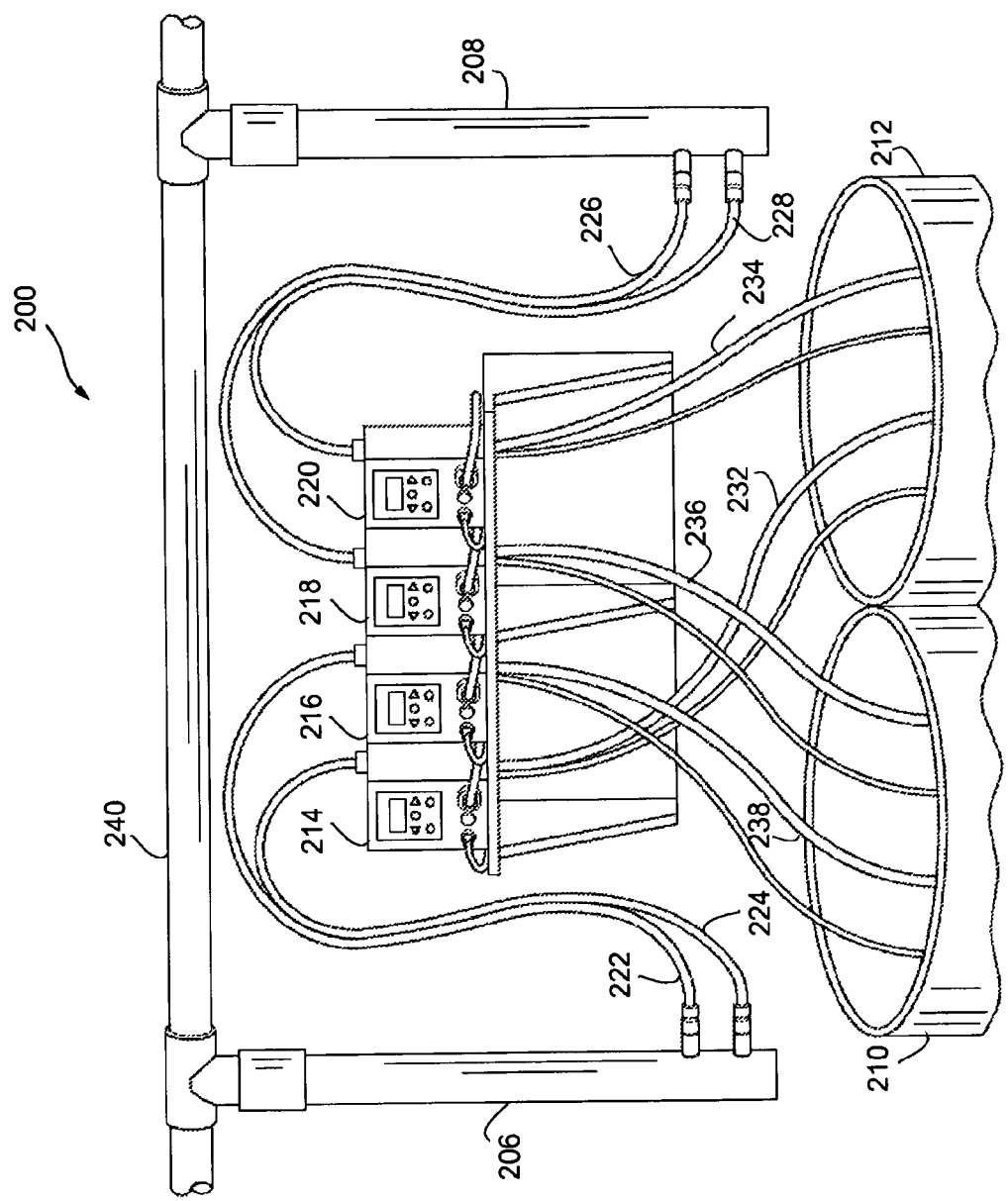
FIG. 2 shows an embodiment of a chlorine dioxide dosing system that includes two chlorine dioxide reactors.

FIG. 2 shows a chlorine dioxide generator system 200 used to treat a 160,000 gallon swimming pool (not shown). The system 200 includes a first reactor 206 and a second reactor 208 that are in fluid communication with a pool pipe 240, which pertains to the flow stream of the pool targeted by system 200. The system 200 also includes a first tank 210 containing a 15 percent, pph, aqueous sodium chlorite solution and a second tank 212 containing a 45-55 percent, pph, aqueous concentration (preferably 50 percent, pph), of sulphuric acid. The reactants in tanks 210 and 212 fluidly communicate with pumps 216, 218 and 214, 220 respectively, via tubes 236, 238 and 234, 232, respectively. Pumps 214 and 216 pump sodium chlorite and acid into reactor 206 via tubes 224 and 222, respectively. Pumps 218 and 220 pump sodium chlorite and acid into second reactor 208 via tubes 226 and 228, respectively. Table 1 sets forth a calculation demonstrating a maximum chlorine dioxide output using system 200 pertaining to a target reaction time of 3 minutes.

Example 2

The inventors have realized that the unique characteristics of the reaction chemistry utilized in their system embodiments allows for much greater flexibility in the dosing of chlorine dioxide, with one generator being able to provide a wide range of chlorine dioxide concentrations to the treatment stream. The examples set forth in Table 2 illustrate this characteristic. Table 2 shows that a single generator having a capacity of 2.0 liters is able to provide a range of 27 lbs/day to 404 lbs/day chlorine dioxide for an application A series of these generators enables the supply of a large or small quantity of chlorine dioxide for any application with a level of safety and flexibility previously unattainable.

The teachings of any references herein, including patent related documents, are incorporated herein in their entirety to the extent not inconsistent with the teachings herein. While various embodiments of the present inventions have been shown and described herein, it will be obvious that such embodiments are provided by way of example only. Numerous variations, changes and substitutions may be made without departing from the inventions herein. Accordingly, it is intended that the inventions be limited only by the spirit and scope of the appended claims.

TABLE 1

1 DETERMINE VOLUME OF CHLORITE REQUIRED TO GENERATE ENOUGH CHLORINE DIOXIDE TO ADD TO POOL
(target concentration is 3 ppm, assume 85% conversion of 15% chlorite, or 12.75% concentration of generated ClO2)

(P1)     (V1)   =   (P2)    (V2)           where:   $P1$ = starting concentration of ClO2
127500    x         3       160000                  $V1$ = starting volume of chlorite
         3.765                                      $P2$ = ending concentration of ClO2
                                                    $V2$ = ending volume 3.76    gallons 15% NaClO2
        +  3.76    gallons 50% H2SO4
        =  7.53    gallons total
        =  28499   mL total volume required (chlorite + acid)

2 CALCULATE THE GENERATOR OUTPUT
(based on the generator volume, how much of each chemical can be pumped through to allow 3 minute reaction time)
Generator Capacities
G1 = 1050 mL
G2 = 1500 mL G1   1050  ml   =  350   ml/min total capacity
      3    min  =  175   ml/min each chemical G2   1500  ml   =  500   ml/min total capacity
      3    min  =  250   ml/min each chemical So - the concentration of ClO2 can be calculated based on the flow rate of the treatment stream or carrier water
(assume a flow rate of 60 gpm for the example)

60     gpm
            ×   3785   ml/gal
            =   227100 ml/min

P1     V1   =   P2     V2

TABLE 1-continued

1

G1  1E+05  175  =  98   227100
G2  1E+05  250  =  140  227100
                    239

In this example, 239 ppm (mg/L) can be added to the treatment stream with a three minute contact time in the generator given a process stream flow rate of 60 gpm.
The dose can be effectively doubled by doubling the chemical pump outputs. This would still allow 1.5 minutes contact time in the generator, which is sufficient for conversion of the chlorite to chlorine dioxide.
Conversely, the dose rate can be lowered substantially by decreasing the pump output. Since the reaction is not sensitive to extended holding times (up to 15 minutes with no appreciable degradation of chlorine dioxide)
This is the key to the generator patent. We can produce chlorine dioxide in concentrations ranging from very low, to very high concentrations depending on the flow rates and generator volumes
I believe this is a characteristic which is unique to this generator design as a result of the 'forgiveness' of the chemistry.
For a given demand (for example, to treat a process stream at a dose rate ranging from 5 ppm to 100 ppm), once we know the flow rate, we can select chemical pumps with outputs in the correct range of volumes, and build a generator with the capacity to allow generation of chlorine dioxide throughout this range.

Generator Capacity Example:

TABLE 2

Output example for a 2 Liter capacity ClO2 generator at highest ouput
using 15% (pph) sodium chlorite at an 85% conversion rate, 1 minute contact time is targeted for complete reaction to take place
Since one liter of chlorite mixes with 1 liter of acid, a 1 L/min flow will allow 1 minute contact time with both reagents.

$$127500 \frac{mg}{L} \times 1 \frac{L}{min} = 127500 \frac{mg}{min} \times 1440 \frac{min}{day} = 183600000 \frac{mg}{day} = 183600 \frac{grams}{day} \times \frac{1}{454} \frac{lb}{grams} = 404.41 \frac{lbs}{day}$$

Example of low output:

$$127500 \frac{mg}{L} \times \frac{1}{15} \frac{L}{min} = 8500 \frac{mg}{min} \times 1440 \frac{min}{day} = 12240000 \frac{mg}{day} = 12240 \frac{grams}{day} \times \frac{1}{454} \frac{lb}{grams} = 26.96 \frac{lbs}{day}$$

Due to the flexibility of the chemistry (complete conversion of chlorite to chlorine dioxide occurs in as little as 1 minute, and no degredation to chlorate occurs after 15 minutes residence time in the generator), a single generator is able to produce anywhere from ~27 lbs/day to ~404 lbs day of chlorine dioxide without the need to 'trim' the generator or make any modification to the actual reaction vessel.
This is a significant and unique benefit of this design, as substantial variations in flow rate or demand of the treatment stream can be accomodated by adjustment of the chemical pump speeds via input from a flow-meter or chlorine dioxide sensor.

What is claimed is:

1. A water treatment system, comprising:
a conduit having an inlet fluidly connectable to a source of water to be treated;
a source of sulfuric acid;
a source of sodium chlorite;
a first in-situ chlorine dioxide reactor having a first reactor volume in fluid communication with the sources of sulfuric acid and sodium chlorite and in fluid communication with the water to be treated at a first point of addition in the conduit; and
a second in-situ chlorine dioxide reactor having a second reactor volume in fluid communication with the sources of sulfuric acid and sodium chlorite and in fluid communication with the water to be treated at a second point of addition in the conduit downstream of the first position, the second reactor volume being different than the first reactor volume; and
a system controller configured to control introduction of chlorine dioxide to the water to be treated by controlling a first flow rate of the sulfuric acid and a first flow rate of the sodium chlorite to the first generator and a second flow rate of sulfuric acid and a second flow rate of sodium chlorite to the second generator in response to monitoring of a system parameter.

2. The system of claim 1, further comprising:
first and second sulfuric acid pumps configured to deliver the sulfuric acid from the source of sulfuric acid to the first and second in-situ chlorine dioxide reactors, respectively; and
first and second sodium chlorite pumps configured to deliver the sodium chlorite from the source of sodium chlorite to the first and second in-situ chlorine dioxide reactors, respectively.

3. The system of claim 2, wherein the system controller is further configured to adjust a pumping rate of at least one of the first sulfuric acid pump, the second sulfuric acid pump, the first sodium chlorite pump, and the second sodium chlorite pump, based on the system parameter being outside of a desired range.

4. The system of claim 2, wherein the system parameter comprises at least one of the flow rate of the sulfuric acid to at least one of the first and second in-situ chlorine dioxide reactors, the flow rate of sodium chlorite to at least one of the first and second in-situ chlorine dioxide reactors, the flow rate of the water to be treated in the conduit, the chlorine dioxide concentration of the water to be treated at a point in the conduit, and the chlorine dioxide output from one of the first and second in-situ chlorine dioxide reactors.

5. The system of claim 2, further comprising a check valve and a foot valve positioned on either side of each of the first sulfuric acid pump, second sulfuric acid pump, first sodium chlorite pump, and second sodium chlorite pump.

6. The system of claim 2, further comprising a calibration column on a discharge side of each of the first sulfuric acid pump, the second sulfuric acid pump, the first sodium chlorite pump, and the second sodium chlorite pump.

7. The system of claim 1, wherein the sulfuric acid source comprises a 30-60 percent aqueous sulfuric acid solution.

8. The system of claim 7, wherein the sulfuric acid source comprises a 45-55 percent aqueous sulfuric acid solution.

9. The system of claim 8, wherein the sulfuric acid source comprises a sulfuric acid solution of 50 percent sulfuric acid.

10. The system of claim 1, wherein the sodium chlorite source comprises a sodium chlorite solution of about 7.5 to about 25 percent.

11. The system of claim 10, wherein the sodium chlorite source comprises a sodium chlorite solution of about 12 to about 17 percent.

12. The system of claim 11, wherein the sodium chlorite source comprises a sodium chlorite solution of 15 percent.

13. The system of claim 1, wherein a volume of acidifying agent and a volume of sodium chlorite are delivered to the at least one reactor according to a ratio in the range of 0.1-10.0:10-0.1.

14. The system of claim 13, wherein the ratio is in the range of 1-5:5-1.

15. The system of claim 13, wherein the ratio is 1:1.

16. The system of claim 1, wherein each of the first and second in-situ chlorine dioxide reactors fluidly communicates at a top end thereof to the conduit and the acidifying agent and the sodium chlorite is delivered at a bottom end of each of the first and second in-situ chlorine dioxide reactors.

17. The system of claim 1, further comprising a flow switch positioned in the conduit.

18. The system of claim 17, further comprising:
a first chemical feed line fluidly connecting the source of sulfuric acid to the first in-situ chlorine dioxide reactor;
a second chemical feed line fluidly connecting the source of sulfuric acid the second in-situ chlorine dioxide reactor;
a third chemical feed line fluidly connecting the source of sodium chlorite to the first in-situ chlorine dioxide reactor; and
a fourth chemical feed line fluidly connecting the source of sodium chlorite to the second in-situ chlorine dioxide reactor.

19. The system of claim 18, wherein each of the chemical feed lines further comprises a flow switch.

20. The system of claim 19, wherein each flow switch of the chemical feed lines is connected in series and configured to cease all flows in response to a flow being interrupted.

21. The system of claim 1, further comprising the source of sulfuric acid comprises a first chemical storage tank and the source of sodium chlorite comprises a second chemical storage tank.

22. The system of claim 21, further comprising a first level indicator on the first chemical storage tank and a second level indicator on the second chemical storage tank.

23. The system of claim 1, further comprising a feed line fluidly connectable to a flushing fluid and at least one of the first and second in-situ chlorine dioxide reactors to flush at least one of the first and second in-situ chlorine dioxide reactors.

24. The system of claim 23, wherein the flushing fluid is one of water and a chemical solution.

* * * * *